(12) United States Patent  
Jones et al.

(10) Patent No.: US 7,428,874 B2
(45) Date of Patent: Sep. 30, 2008

(54) MULTIPLE SIZED SEED DISPENSER AND TURF AERATOR

(75) Inventors: Donald C. Jones, Tifton, GA (US); Robert Funk, Sycamore, GA (US)

(73) Assignee: First Products, Inc., Tifton, GA (US)

( * ) Notice: Subject to any disclaimer, the term of this patent is extended or adjusted under 35 U.S.C. 154(b) by 146 days.

(21) Appl. No.: 11/516,244

(22) Filed: Sep. 6, 2006

(65) Prior Publication Data

US 2008/0053350 A1 Mar. 6, 2008

(51) Int. Cl.
*A01C 7/00* (2006.01)
*A01C 9/00* (2006.01)

(52) U.S. Cl. ..................................... 111/182
(58) Field of Classification Search .............. 111/178, 111/182

See application file for complete search history.

(56) References Cited

U.S. PATENT DOCUMENTS

| | | | |
|---|---|---|---|
| 169,283 A | 10/1875 | Morgan | |
| 496,782 A | * 5/1893 | Henry | ................... 111/59 |
| 1,134,894 A | * 4/1915 | Newton | ................ 111/178 |
| 2,777,613 A | 1/1957 | Hartje | |
| 4,196,678 A | 4/1980 | Lore et al. | |
| 4,609,131 A | 9/1986 | Tieben | |
| 4,901,655 A | 2/1990 | Magda | |
| 5,209,306 A | 5/1993 | Whitfield | |

* cited by examiner

*Primary Examiner*—Christopher J. Novosad
(74) *Attorney, Agent, or Firm*—Thomas, Kayden, Horstemeyer & Risley, LLP (57) ABSTRACT

A seeder (20) includes a seed hopper (22) that feeds seed by gravity to a seed dispenser (24). The seed feed wheels (38) of the seeder are mounted in a seed metering tube (30) so that rotation of the seed feed wheels meters the output of the seeds. The seed feed wheels can be formed in segments (50 and 60) so that by matching different segments, different sizes of seed receiving detents can be used for dispensing the seeds. An adjustment bracket (72) shifts the seed feed wheels so that different sizes of detents can register with the openings of the seed metering tube (30), thereby achieving the desired matching of sizes of detents with the sizes of the seeds.

14 Claims, 6 Drawing Sheets

MULTIPLE SIZED SEED DISPENSER AND TURF AERATOR

FIELD OF THE INVENTION

This invention concerns a method and apparatus for aerating turf and other ground cover vegetation, and for dispensing seeds from a seed hopper carried with the aerator to the aerated turf. More particularly, the invention concerns a seed dispenser that can be expediently adjusted for dispensing seeds of different sizes.

BACKGROUND OF THE INVENTION

Various devices have been developed in the past that are used in the treatment and care of turf such as grass or other ground covers of lawns, ball fields, golf courses, and the like. It is desirable to aerate the turf so as to enable air, moisture and nutrients to reach the roots of the grass, etc. The aeration of turf generally is performed by forming a pattern of holes in the turf. The holes tend to disturb the soil and roots beneath the surface of the ground cover, and when moisture and fertilizer are applied to the turf, the root structure of the turf is able to directly absorb these nutrients and thereby the growth of the root structure is stimulated, making the turf healthier.

A typical aerator includes a rotary drum having spikes or tines mounted to and extending radially from the cylindrical surface of the drum. The drum is moved across the turf and the tines tend to penetrate the turf so that the drum and tines "walk" across the turf. The aerator is usually pulled behind a tractor with the aerator rotating against the turf in response to the forward motion of the tractor.

Some of the prior art aerators have had a plurality of hollow coring tines that penetrate the turf and cut a generally cylindrical core or plug in the turf. When the coring tines are pulled away from the turf, they usually lift the plug out of the ground, leaving a residue of cores of soil on the surface of the ground. The residue of cores of soil is undesirable on lawns and on playing fields such as golf courses and baseball fields where the condition of the surface of the turf is very important to the sports person. A type of core producing aerator is disclosed in U.S. Pat. No. 4,773,486.

An improvement over the aerators that utilize coring tines is described in U.S. Pat. No. 5,209,306, the disclosure of which is incorporated herein in its entirety. The tines of the aerator are solid so that no core of soil is formed, and the power take-off from the tractor is connected to the aerator so that the tines are moved in an oscillating motion so that they "wobble" as they rotate with the aerator. This wobbling movement tends to enlarge the holes in the turf that are formed by the tines, thereby enhancing the amount of aeration and the degree in which the moisture, fertilizer, etc. can penetrate the turf.

In many situations, it is desirable to simultaneously dispense seeds to the turf and simultaneously penetrate the turf with the aerator, so as to re-seed the turf. The usual method for applying seeds to the turf is to load a hopper with seeds and progressively feed the seeds from the hopper to a seeder at the exit of the hopper. The seeder may be in the form of a plurality of cylindrical wheels. The perimeter surface of each cylindrical wheel has a series of seed detents oriented circumferentially thereabout, and the seeds from the hopper fall into the detents and move with the seed feed wheels to an outlet where the seeds drop, usually through a conduit, to the ground below the apparatus.

The use of seed feed wheels in seeders is common and has been in wide use for a long time. However, when the type of seed is to be changed in the hopper, such as changing from a small seed like Centipede or Bent Grass seed or Bermuda seed to a larger seed such as Fescue seed, or vice versa, it is desirable to change the feed wheels so that the detents in the feed wheels are the right size to accommodate the seeds.

Another method to accommodate a change in seed size is to carry two seeders on one machine, one inactive while the other one operates. The different size seeds could be placed in the separate hoppers of the dual seeder. However, seeders are usually operated in environments where they dispense the same sized seeds over a long period of time, without requiring a more expensive dual hopper arrangement. Therefore, the more typical situation is to use a single hopper seeder with single sized seed feed wheels that must be changed out when the size of the seeds is changed.

Accordingly, it can be seen that it would be desirable to produce an apparatus that performs the function of accurately seeding turf and, when appropriate, being adapted for expedient exchange of seed feed wheels when the size of the seeds being dispensed is to be changed.

Another desirable aspect would be that the quick change seed feed wheel assembly be utilized with an improved turf aerator such as disclosed in U.S. Pat. No. 5,209,306 that avoids depositing soil plugs on the surface of the turf and that forms the more desirable larger lateral dimensions in the openings below the surface of the turf for receiving the seeds from the seed hopper and inducing improved growth of the root structure of the ground cover. It is to these features that this invention is directed.

SUMMARY

Briefly described, the present invention comprises a seed dispensing apparatus for dispensing seeds of different sizes in a broadcast pattern on the soil. The apparatus includes a cylindrical seed metering tube defining at spaced intervals along its length a series of pairs of seed openings. Each pair of seed openings includes a seed entrance opening and a seed discharge opening, the seed entrance openings being positioned on one side of the seed metering tube and the discharge openings positioned diametrically opposite to the entrance openings. A plurality of seed feed wheels are positioned in the seed metering tube with each seed feed wheel positioned in alignment with a pair of seed openings of the seed metering tube. The seed feed wheels each include a pair of lines of seed detents oriented circumferentially about the seed feed wheel with the detents of one of the lines of seed detents being of greater size than the seed detents of the other line of seed detents for feeding seeds of different sizes through the dispenser. A feed wheel positioner is used for shifting the seed feed wheels along the length of the cylindrical seed metering tube. This permits one of the lines of seed detents of each seed feed wheel to be moved toward registration with the pairs of seed openings of the seed metering tube as the other lines of seed detents are moved out of registration with the pairs of seed openings.

With this arrangement, the operator of the seed dispensing apparatus can shift the seed feed wheels incrementally so as to expose more or less of the seed detents to the pairs of seed openings of the seed metering tube, thereby dispensing more or fewer seeds from the seed hopper.

Seed delivery conduits extend from each of the seed discharge openings of the cylindrical seed metering tube toward the turf for guiding the seeds from the seed discharge openings to the turf.

In one embodiment of the invention, the seed feed wheels each include wheel segments positioned side by side. The seed detents of one wheel segment are larger than the seed detents in the other wheel segment. The composite seed feed wheels made from the segments having different sized detents are capable of dispensing different sized seeds.

In an embodiment of the invention, the wheel segments each include a smooth cylindrical bearing surface positioned adjacent the line of seed detents.

The invention may also include the improved soil aerator, with the soil aerator mounted adjacent the seed metering tube of the seed dispenser, with the soil aerator including tines for penetrating and aerating the soil, and a following turf smoothing roller. The smoothing roller rolls over the aerated turf and smoothes the turf where the tines have been withdrawn from the turf. A rotary power means such as the smoothing roller that engages and rotates on the ground and a rotary drive means such as a chain and gear arrangement extends between the seed feed wheels, and the rotary power means rotates the seed feed wheels in timed relationship with the advancement of the invention over the ground. With this arrangement, when the forward motion of the apparatus pauses or changes velocity, the seeder will respond by changing its velocity so that its velocity corresponds directly to the rotational velocity of the smoothing roller. This avoids differences in the amount of seed dispensed to the turf.

With this arrangement, when the smoothing roller is lifted from the turf and terminates its rotation, the rotation of the seed feed wheels also terminates, thereby terminating the dispensing of seed. Thus, seed is dispensed only when the soil is being aerated.

DETAILED DESCRIPTION

Figure 1:
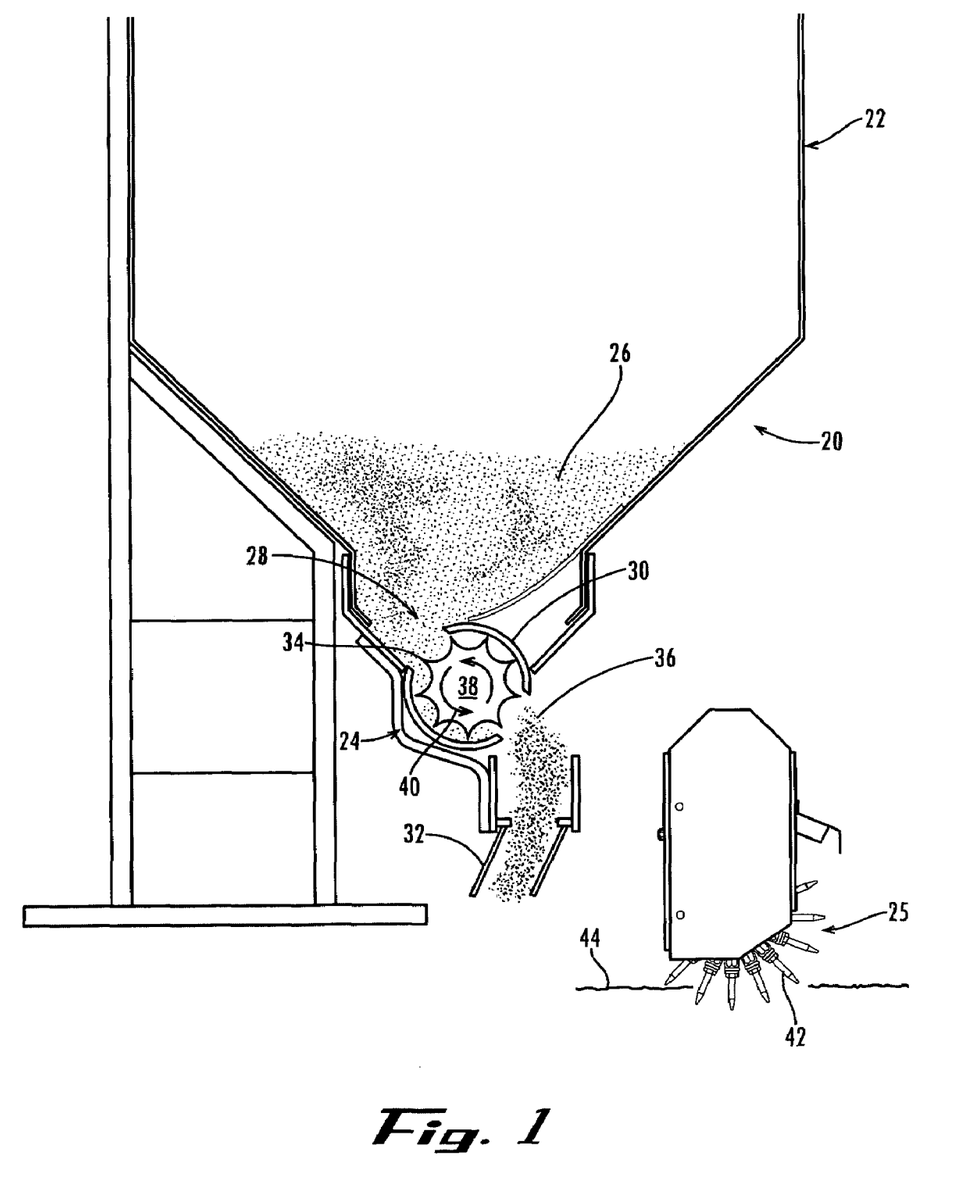
FIG. 1 is a schematic side elevational view of the seed dispensing apparatus, showing the hopper partially filled with seed, the seed feed wheels and a portion of the aerator.

Referring now in more detail to the drawings, in which like numerals indicate like parts throughout the several views, FIG. 1 illustrates a seeder 20 that includes a seed hopper 22 and seed dispenser 24 that are mounted on a framework towed behind a tractor or other self propelled vehicle (not shown). An aerator 25 is mounted to the same framework and seed can be dispensed from the seeder 20 in a broadcast pattern either before or after the aerator.

A supply of seed 26 is contained within the seed hopper 22 and the seed hopper has a lower seed outlet opening 28 that faces the seed dispenser 24.

As shown in FIGS. 1, 12, 13 and 15, the seed dispenser 24 includes a rectilinear cylindrical seed metering tube 30 that receives seed from the seed hopper outlet opening and dispenses it in predetermined quantities to a plurality of seed delivery tubes 32. The seed metering tube 30 has a series of pairs of seed openings, each pair including a seed entrance opening 34 that registers with the hopper seed outlet opening 28, and a seed discharge opening 36 that registers with a seed delivery conduit 32.

A plurality of seed feed wheels 38 are positioned in the seed metering tube 30, with each seed feed wheel in registration with the pairs of seed entrance openings 34 and seed discharge openings 36. The seed feed wheels 38 rotate as indicated by the arrows 40 and meter the seeds from the seed supply 26 through the seed metering to the seed delivery tubes 32.

The aerator 25 includes an array of radially extending tines 42 that are mounted about an axle, with the tines being rotatable about the axle so that they "walk" across the turf 44. The aerator is disclosed in greater detail in U.S. Pat. No. 5,209,306, such that a detailed explanation of its structure and function is not necessary.

Figure 2:
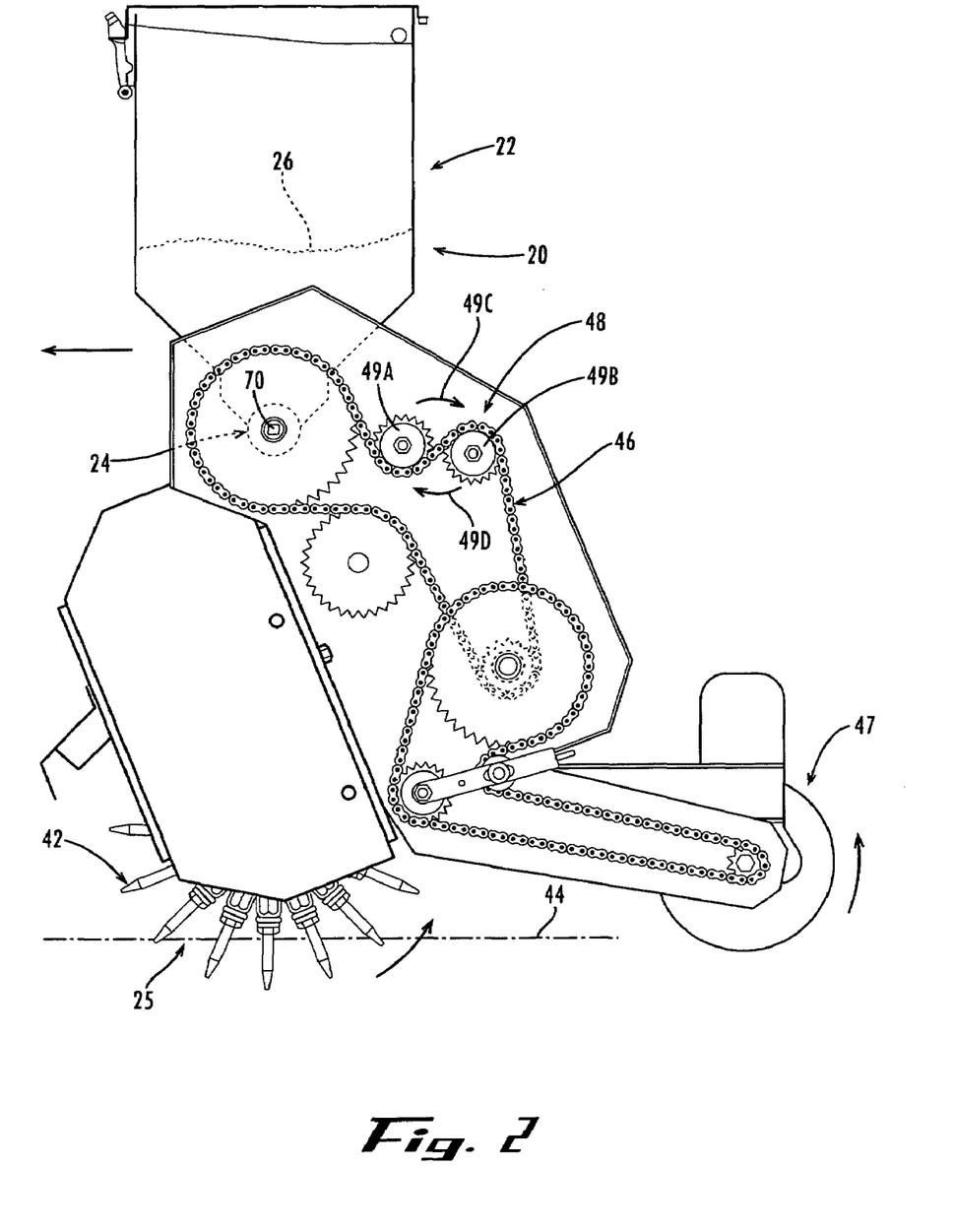
FIG. 2 shows the drive mechanism extending between the smoothing roller and the seed feed wheels.
Figure 3:
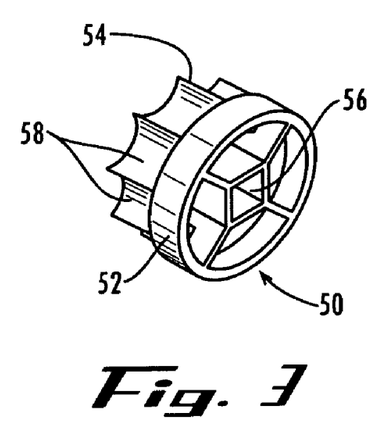
FIGS. 3 and 4 are isometric views of a segment of a seed feed wheel, with FIG. 3 showing the right side of the segment and FIG. 4 showing the left side of the segment.
Figure 4:
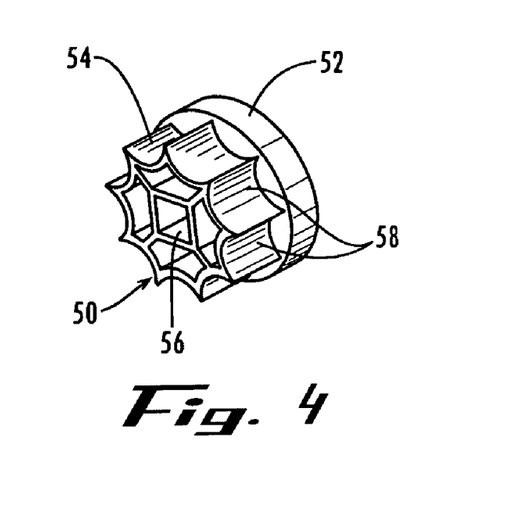
Figure 5:
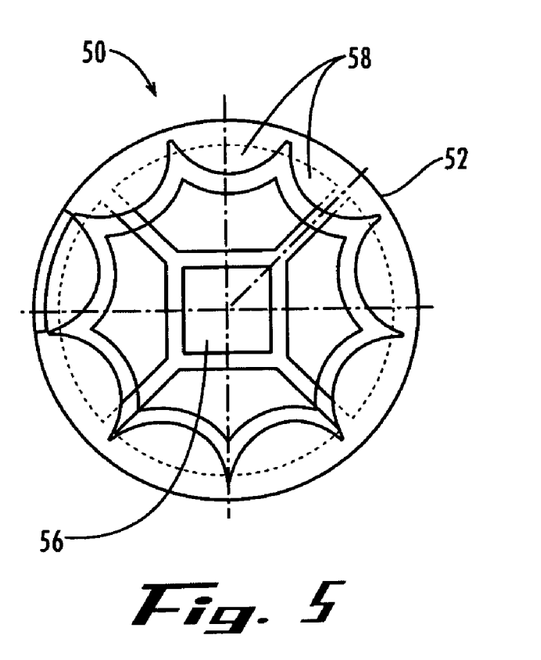
FIG. 5 is a front elevational view of the right side of the seed feed wheel segment of FIGS. 3 and 4.
Figure 6:
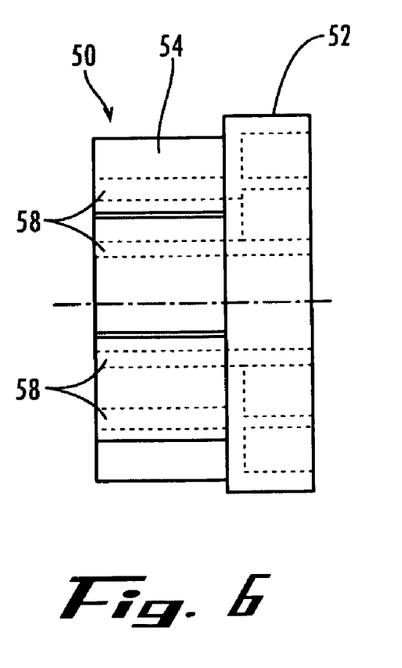
FIG. 6 is a perimeter view of the seed feed wheel segments of FIGS. 3-5.
Figure 7:
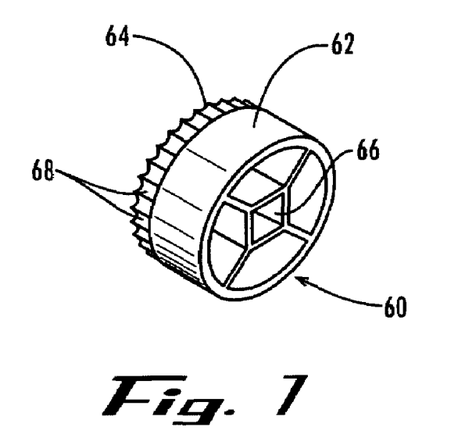
FIGS. 7 and 8 are isometric views of a segment of a seed feed wheel, with the segment having smaller detents than the segments of FIGS. 3-6, with FIG. 7 showing the right side of the seed feed wheel segment and FIG. 8 showing the left side of the seed feed wheel segment.
Figure 8:
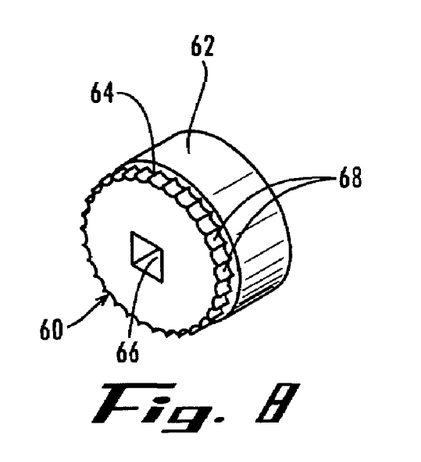
Figure 9:
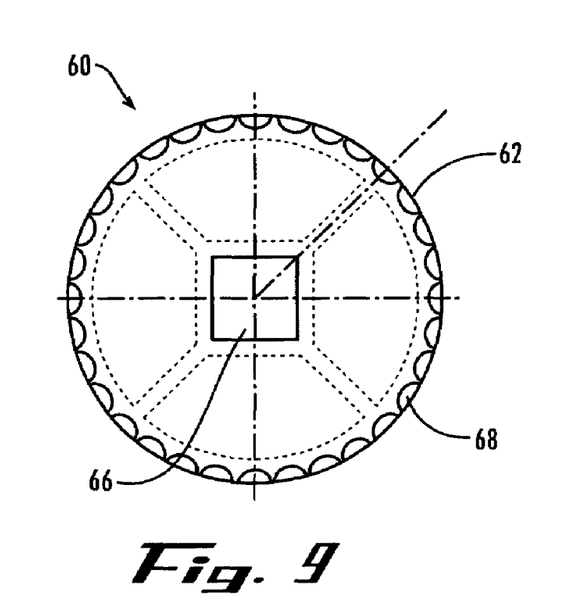
FIG. 9 is a side view of the seed feed wheel segment of FIGS. 7 and 8.
Figure 10:
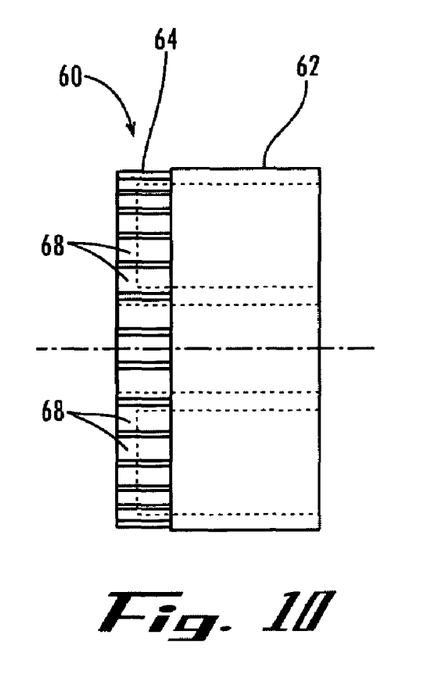
FIG. 10 is a perimeter view of the seed feed wheel segment of FIGS. 7-9.

FIG. 2 illustrates a chain drive 46 that extends between the rear smoothing roller 47 of the aerator 25 and the axle 70 of the seed dispenser 24, whereby rotation of the smoothing roller 47 results in simultaneous rotation of the seed feed wheels 38. In instances where the size of the seeds to be dispensed from the seeder is to be changed, it might be necessary to change the size of the sprockets of the chain drive. This might depend upon the capacity of the seed feed wheels 38. A chart (not shown) is provided by the producer of the seeder to determine the best combination of sprockets and seed feed wheels to use with a specific seed. To facilitate the change of sprockets, the length of the chain of the chain drive is longer than necessary to make proper engagement with the teeth of all of the sprockets, and an idler sprocket assembly 48 is used to adjust the chain length. The sprockets 49A and 49B of the idler sprocket assembly are pivotable about a common axis on opposite sides of the drive chain as indicated by arrows 49C and 49D to take up the slack in the drive chain. This permits forming more slack in the chain while the sprockets are being exchanged, and then tightening the chain about the replacement sprockets.

While the smoothing roller 47 is disclosed as a rotary power source and the chain drive 46 is disclosed as a rotary drive means for imparting rotary motion to the seed feed wheels 38, other rotary power means may be employed for the same purpose such as the aerator 25 or other ground engaging rotary device, and other rotary drive means may be employed such as belt and sheave drive extending between the ground engaging rotary device and the seed feed wheels.

As shown in FIGS. 3-11, the seed feed wheels 38 may be formed in pairs of segments such as segments 50 and 60. The segments of each pair have the same diameter but have different sized seed detents so that segments of different sized detents can be matched together to dispense different sized seeds. FIGS. 3-6 show one of the segments 50 of a seed feed wheel that has larger sized detents 58. The rotary segment 50 with larger sized detents includes an annular bearing surface 52 and an adjacent annular detent surface 54, both of which are coaxial with the non-circular drive shaft opening 56.

The annular detent surface 54 includes an annular array of concave, radially outwardly facing detents 58, with the detents being equally spaced about the perimeter of the segments, and the detents all being of the same size, both in depth and length.

FIGS. 7-10 illustrate the rotary segment 60 having smaller sized detents and that has an annular bearing surface 62 and an annular detent surface 64, with both the annular bearing surface 62 and the annular detent surface 64 being coaxial with the drive shaft opening 66. The annular detent surface 64 includes an annular array of concave, radially outwardly facing detents 68. The construction of the small size rotary segment 60 and the large size rotary segment 50 are substantially the same, except for the sizes of the detents 58 and 68.

Figure 11:
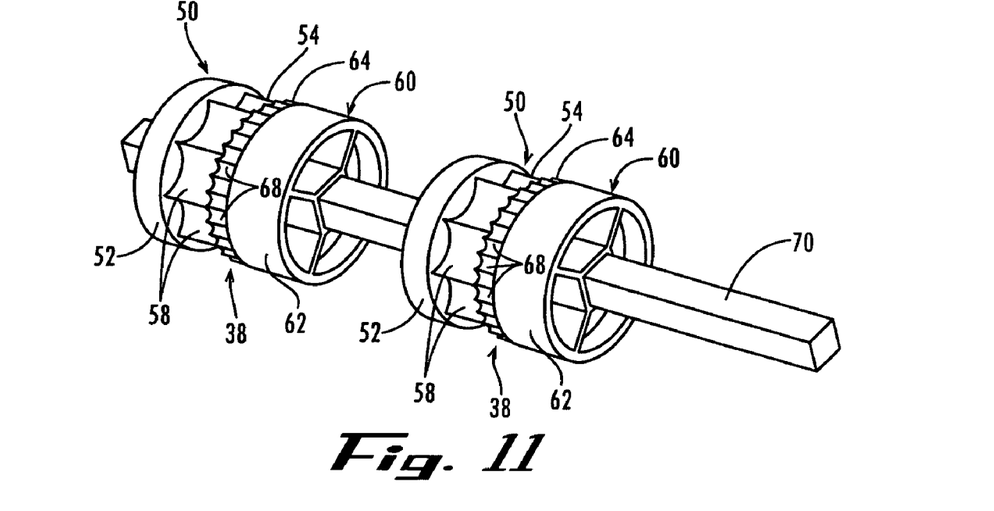
FIG. 11 is an isometric view of a pair of seed feed wheels mounted on a central drive shaft, with the seed feed wheel segments having their detents juxtaposed.

As shown in FIG. 11, one of the large size rotary segments 50 is matched with one of the small size rotary segments 60 to make up one seed feed wheel 38. The segments 50 and 60 are mounted coaxially on a drive shaft 70.

Figure 12:
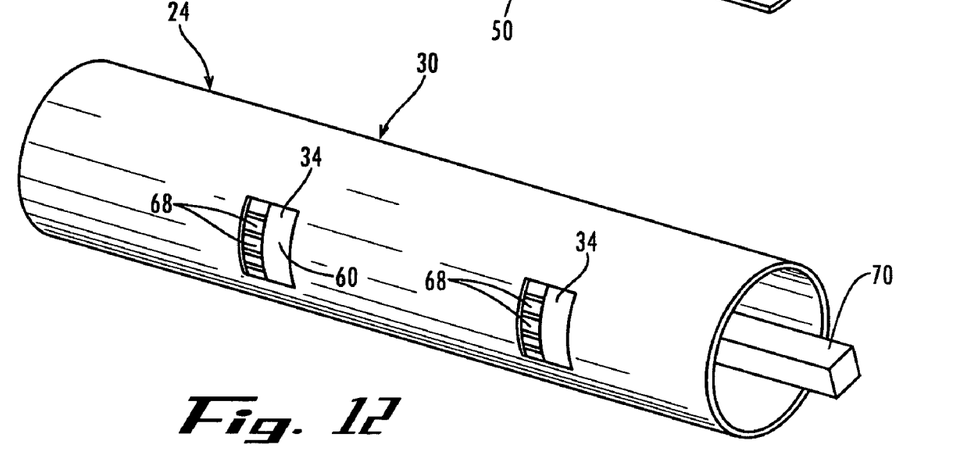
FIG. 12 is an isometric view of the rectilinear cylindrical seed metering tube, showing openings in the tube for the passage therethrough of seeds toward the detents of the seed feed wheels.
Figure 13:
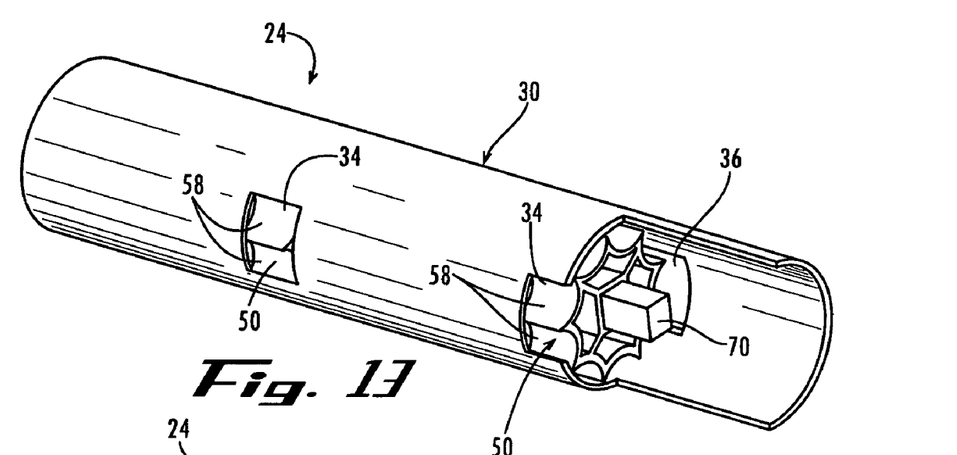
FIG. 13 is an isometric view, similar to FIG. 12, but having a portion thereof broken away to expose more surfaces of the seed feed wheels.

As shown in FIGS. 12 and 13, the seed feed wheel segments 50 and 60 are mounted in abutment with each other on the drive shaft 70 and are telescopically fitted within the seed metering tube 30. The detents of at least one of the seed feed wheel segment 50 or the seed feed wheel segment 60 are moved into registration with the seed entrance opening 34 and seed discharge opening 36 of the seed metering tube.

Figure 14:
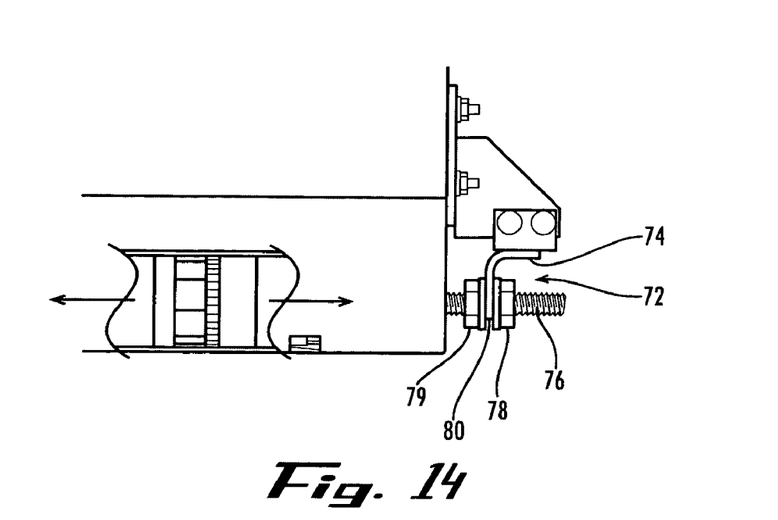
FIG. 14 is a front elevational view of a wheel position adjustment means for shifting the drive shaft and its seed feed wheels incrementally along the length of the cylindrical seed metering tube, for exposing more of or less than the seed detents of each wheel segment.
Figure 15:
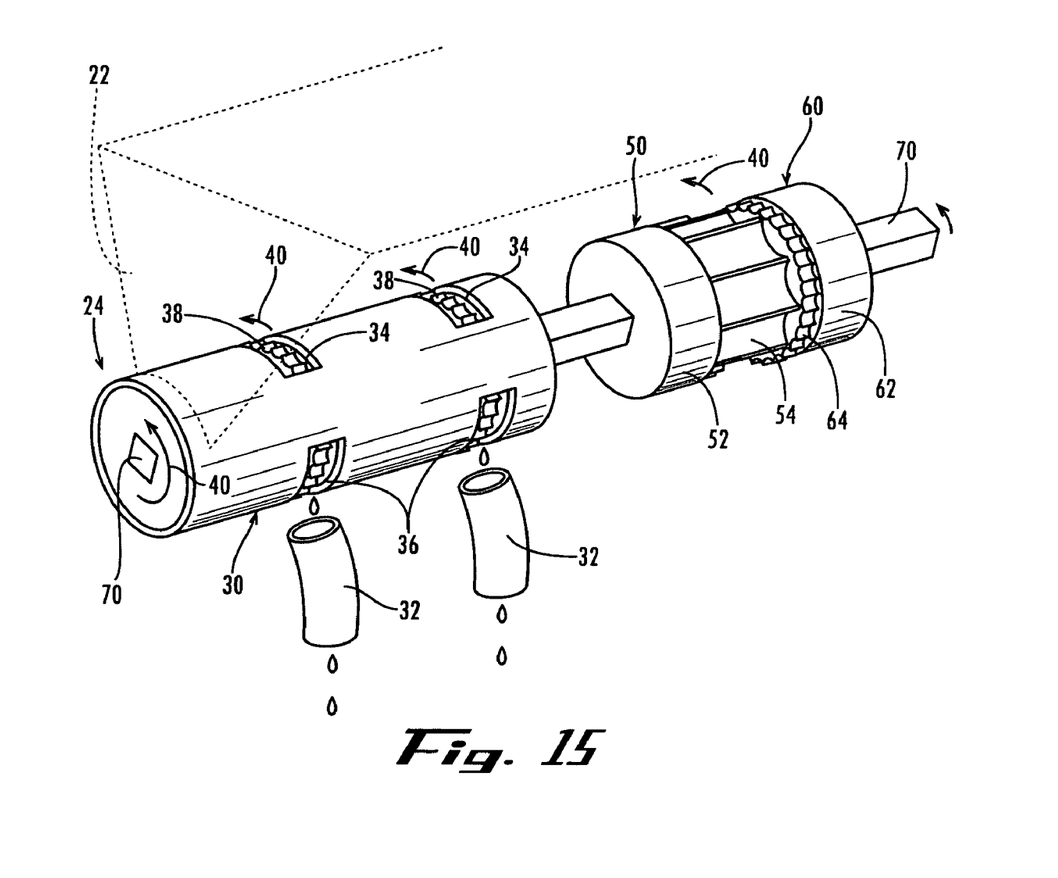
FIG. 15 is an isometric view of the assembled seed dispensing apparatus, with parts broken away for revealing one of the seed feed wheels.

FIG. 14 illustrates the adjustment bracket 72 for the seed feed wheels 38 that functions as a feed wheel position adjustment means for moving the seed feed wheels 38 along the length of the seed metering tube 30. The longitudinal movement of the seed feed wheels adjusts the amount of registration of the annular detent surfaces 54 and/or 64 that register with the entrance opening 34 and discharge opening 36 of the pairs of openings about the seed metering tube 30. The feed wheel position adjustment bracket 72 includes an L-shaped bracket 74 that has one leg mounted to the frame of the apparatus and another leg that aligns the threaded screw 76 with the drive shaft 70 of the seed dispenser 24 through a nylon bearing 80. Lock nuts 78 and 79 are used to engage the threads of the adjusting screw 76 on opposite sides of the bearing 80 of the bracket 74. By repositioning the lock nuts along the length of the adjusting screw, the adjusting screw can move the drive shaft 70 with the seed feed wheels 38 axially through the seed metering tube 30. This exposes more or less of the detents of the seed feed wheels, or exposes different detents of the seed feed wheels.

Typically, the seed feed wheels will be set up in accordance with size in anticipation of the types of seeds that are to be dispensed by the seeder. FIG. 12 shows the set up for small seeds and FIG. 13 shows the set up for large seeds. With this arrangement, when the first sized seed is to be dispensed, the appropriate sized seed feed wheel segment 50 will register with the seed entrance openings 34 and seed discharge openings 36 of the seed metering tube 30. When the smaller sized seeds are to be dispensed from the hopper 22, the lock nuts 78 and 79 of the adjustment bracket 72 are repositioned along the length of the threaded adjustment screw 76 to the extent necessary to make the proper repositioning of the seed feed wheel segments 50 and 60.

It will be noted that the feed wheel segments 50 and 60 are oriented so that their annular detent surfaces 54 and 64 are juxtaposed each other, so that only a small amount of adjustment by the adjustment bracket 72 is required for changing the size of the annular array of concave radially outwardly facing detents 58 and 68.

Further, the feed wheel segments 50 and 60 of the seed feed wheels 38 can be shifted longitudinally in the seed dispenser tube 30 so that portions of both of the detents of the feed wheel segments 50 and 60 can be exposed for fine adjustment of the quantity of seeds to be dispensed.

Although preferred embodiments of the invention have been disclosed in detail herein, it will be obvious to those skilled in the art that variations and modifications of the disclosed embodiments can be made without departing from the spirit and scope of the invention as set forth in the following claims.

We claim:

1. A seeder for dispensing seeds of different sizes on the soil, comprising:

a seed metering tube defining at spaced intervals along its length a series of pairs of seed openings, each pair of seed openings including a seed entrance opening and a seed discharge opening, the seed entrance openings being positioned on diametrically opposed sides of the seed metering tube from the seed discharge openings, a plurality of seed feed wheels positioned in the seed metering tube with each seed feed wheel positioned in alignment with a pair of seed openings, the seed feed wheels each including at least two lines of seed detents oriented circumferentially about the seed feed wheel with the detents of one of the lines of seed detents being of greater size than the seed detents of the other line of seed detents for feeding seeds of different sizes, the seed feed wheels each including smooth cylindrical bearing surfaces positioned on opposite sides of and adjacent the line of seed detents, and adjustment means for shifting the seed feed wheels along the length of the cylindrical seed metering tube such that one of the lines of seed detents of each seed feed wheel can be moved toward registration with the pairs of seed openings of the cylindrical seed metering tube as the other lines of the seed detents are moved out of registration with the pairs of seed openings and a smooth bearing surface of the seed feed wheels can move into registration with the pairs of seed openings.

2. The seeder of claim 1, and further including a seed hopper mounted in seed feeding communication with the seed entrance openings of the seed metering tube.

3. The seeder of claim 2, and further including seed delivery conduits extending from each of the seed discharge openings of the seed metering tube toward the soil for guiding the seed from the seed discharge openings to the soil.

4. The seeder of claim 3, and further including a soil aerator mounted adjacent the seed metering tube, the soil aerator including tines for penetrating and aerating the soil and rotating the soil aerator in response to advancing the soil aerator on the soil, a smoothing roller positioned adjacent the soil aerator for smoothing the aerated soil, and a drive connection extending between the smoothing roller and the plurality of seed feed wheels for rotating the seed feed wheels in timed relationship with the rotation of the smoothing roller.

5. The seeder of claim 1, wherein said plurality of seed feed wheels include wheel segments positioned side by side with one of the pair of lines of the seed detents being positioned in each wheel segment.

6. The seeder of claim 5, wherein the lines of seed detents of adjacent wheel segments are juxtaposed.

7. The seeder of claim 6, wherein the smooth cylindrical bearing surfaces of each pair of wheel segments straddle the seed detents of the pair of wheel segments such that said seed feed wheel annular bearing surface provided on both sides of the feed wheel segment maintains the correct radial relationship between the feed wheel and the seed tube to reduce wear characteristics of the feed wheel and tube, and the smooth cylindrical bearing surfaces also regulate seed flow by shifting the shaft laterally in either direction.

8. The seeder of claim 1, and further including a drive shaft, and the seed feed wheels mounted on the drive shaft.

9. The seeder of claim 1, and further including a ground engaging rotary power source and a rotary drive means connected between the ground engaging rotary power source and the seed feed wheels for rotating the seed feed wheels in timed relationship with the movement of the seeder.

10. A seeder for dispensing seeds of different sizes on the soil, comprising:
    a seed hopper,
    a seed metering tube defining at spaced intervals along its length a series of pairs of seed openings, each pair of seed openings including a seed entrance opening and a seed discharge opening, the seed entrance openings being positioned on opposed sides of the seed metering tube from the seed discharge openings,
    a plurality of seed feed wheels mounted on a common drive shaft positioned in the seed metering tube with each seed feed wheel in registration with a pair of the seed entrance and discharge openings,
    the seed feed wheels each include wheel segments positioned side-by-side, with each wheel segment having a periphery with seed detents formed therein,
    each segment of the seed feed wheels including a smooth cylindrical bearing surface positioned adjacent the seed detents,
    the seed detents of one segment are larger than the seed detents in the other segment in each seed feed wheel, such that the seed feed wheels are capable of dispensing different sized seeds,
    adjustment means for shifting the positions of the seed feed wheels for selective alignment of the lines of seed detents with the pairs of seed openings of the seed metering tube, such that one of the lines of the seed detents of each seed feed wheel can be moved toward registration with the pairs of seed openings of the seed metering tube as the other lines of the seed detents are moved out of registration with the pairs of seed openings of the seed metering tube.

11. The seeder of claim 10, and further including a drive shaft mounted to each of the wheel segments of the seed feed wheels for rotating the wheel segments in unison, and wherein the position adjustment means includes a shaft positioner for moving the drive shaft and the seed feed wheels along the length of the seed metering tube.

12. The seeder of claim 10, and further including a rotary power source for engaging and rolling on the ground surface and rotary power means connected between the rotary power source and the seed feed wheels for rotating the seed feed wheels.

13. A method of dispensing seeds from a seed hopper, comprising:
    providing a cylindrical seed metering tube with a series of pairs of seed entrance openings and seed discharge openings on opposite sides of the diameter of the seed metering tube at intervals along the length of the seed metering tube for registration with the seed hopper,
    placing a plurality of seed feed wheels at the intervals along the seed metering tube in communication with the a seed hopper, with each seed feed wheel defining at least two peripheral rows of seed detents formed therein and smooth cylindrical bearing surfaces adjacent each of the rows of the detents, with the detents of the peripheral rows being of different breadths than the detents of the other peripheral rows, and with at least one row of detents of each seed feed wheel in registration with one of the pairs of seed entrance openings and seed discharge openings of the seed metering tube
    rotating the seed feed wheels to dispense seeds with one of the rows the of detents of each seed feed wheel from the hopper, and
    shifting the position of the seed feed wheels along the seed metering tube to register the different sized detents of the seed feed wheels to the seed metering tube.

14. The method of claim 13, and further including the step of advancing the seed hopper and the seed wheels over the ground, and rotating the seed feed wheels in timed relationship with the advancement over the ground.

* * * * *

UNITED STATES PATENT AND TRADEMARK OFFICE
CERTIFICATE OF CORRECTION

PATENT NO. : 7,428,874 B2
APPLICATION NO. : 11/516244
DATED : September 30, 2008
INVENTOR(S) : Donald C. Jones and Robert Funk Page 1 of 1

It is certified that error appears in the above-identified patent and that said Letters Patent is hereby corrected as shown below:

Col. 8, line 29, delete "a" before "seed".

Col. 8, line 40, delete "the", second occurrence.

Signed and Sealed this

Eighteenth Day of November, 2008

JON W. DUDAS
*Director of the United States Patent and Trademark Office*